US008185112B2

(12) United States Patent
Favre et al.

(10) Patent No.: US 8,185,112 B2
(45) Date of Patent: May 22, 2012

(54) CELLULAR WIRELESS COMMUNICATION DEVICE AND METHOD FOR MANAGING THE RECEIPT OF A HANDOVER COMMAND

(75) Inventors: Guillaume Favre, Toulouse (FR); Cyril Bouvet, Midi Pyrenees (FR); Marc Ratiney, Frouzins (FR)

(73) Assignee: Motorola Mobility, Inc., Libertyville, IL (US)

( * ) Notice: Subject to any disclaimer, the term of this patent is extended or adjusted under 35 U.S.C. 154(b) by 970 days.

(21) Appl. No.: 11/937,044

(22) Filed: Nov. 8, 2007

(65) Prior Publication Data
US 2008/0160989 A1 Jul. 3, 2008

(30) Foreign Application Priority Data

Dec. 29, 2006 (EP) .................................. 06301307

(51) Int. Cl.
*H04W 36/00* (2009.01)
(52) U.S. Cl. .................. 455/436; 455/437; 455/438
(58) Field of Classification Search ........... 455/436–444
See application file for complete search history.

(56) References Cited

U.S. PATENT DOCUMENTS

| 6,101,175 | A  | * | 8/2000  | Schorman et al. | ............. | 370/331 |
|-----------|----|---|---------|-----------------|--------------|---------|
| 6,980,803 | B2 | * | 12/2005 | Johansson       | ............. | 455/438 |
| 7,251,222 | B2 | * | 7/2007  | Chen et al.     | ............. | 370/256 |
| 7,409,214 | B2 | * | 8/2008  | Lee             | ............. | 455/436 |
| 7,756,078 | B2 | * | 7/2010  | Wyk et al.      | ............. | 370/328 |
| 2006/0025151 | A1 | * | 2/2006 | Karaoguz et al. | ............. | 455/455 |
| 2006/0053450 | A1 |   | 3/2006 | Saarikivi et al.|              |         |
| 2006/0099943 | A1 | * | 5/2006 | Koo             | ............. | 455/432.1 |
| 2007/0149206 | A1 | * | 6/2007 | Wang et al.     | ............. | 455/450 |
| 2008/0069013 | A1 | * | 3/2008 | Monier et al.   | ............. | 370/277 |
| 2008/0165761 | A1 | * | 7/2008 | Goppner et al.  | ............. | 370/350 |

FOREIGN PATENT DOCUMENTS

| EP | 1303158    | A1 | 4/2003  |
| GB | 2407738    | A  | 5/2005  |
| GB | 2407745    | A  | 5/2005  |
| WO | 0172077    | A  | 9/2001  |
| WO | 02089502   | A  | 11/2002 |
| WO | 2005041594 | A1 | 5/2005  |

OTHER PUBLICATIONS

3rd Generation Partnership Project; Technical Specification Group GSM/EDGE, Radio Access Network; Radio Subsystem Link Control, Jan. 2006, pp. 1-111, V.7.2.0, 3GPP TS 45.008, Sophia Antipolis Valbonne, France.

3rd Generation Partnership Project; Technical Specification Group GSM/EDGE Radio Access Network; Mobile Radio Interface Layer 3 Specification; Radio Resource Control (RRC) Protocol, Jan. 2006, pp. 1-380, V7.3.0, 3GPP TS 44.018, Sophia Antipolis Valbonne, France.

(Continued)

*Primary Examiner* — Kent Chang
*Assistant Examiner* — Ronald Eisner

(57) ABSTRACT

The present invention provides a cellular wireless communication system, a cellular wireless communication device and a method for managing the receipt of a handover command, where in instances that the synchronization of the target base station of a handover command has been relatively recently lost, the mobile station will not attempt to execute a handover, and will indicate a handover failure without having attempted to execute the handover.

18 Claims, 5 Drawing Sheets

OTHER PUBLICATIONS

3rd Generational Partnership Project; Technical Specification Group GSM/EDGE Radio Access Network; Radio Subsystem Link Control, Aug. 2007, pp. 1-113, V7.5.0, 3GPP TS 45.008, Sophia Antipolis Valbonne, France.

3rd Generation Partnership Progect, Technical Specification Group GSM/EDGE Radio Access Network; Mobile Radio Interface Layer 3 Specification; Radio Resource Control (RRC) Protocol; Sep. 2007, pp. 1-403, V8.0.0, 3GPP TS 44.018, Release 8, Sophia Antipolis Valbonne, France.

* cited by examiner

CELLULAR WIRELESS COMMUNICATION DEVICE AND METHOD FOR MANAGING THE RECEIPT OF A HANDOVER COMMAND

FIELD OF THE INVENTION

The present invention relates generally to the management of a handover command received by a cellular wireless communication device and, more particularly, to managing the command to execute a handover command when the synchronization between the cellular wireless communication device and the target base station to which the command is instructing a handover has recently been lost.

BACKGROUND OF THE INVENTION

Mobile subscribers use wireless communication devices to communicate over a cellular wireless communication network by transmitting and receiving wireless signals between the wireless communication devices and one or more base stations, located at varying distances proximate to the various mobile subscribers.

Changing conditions, including movement of the mobile subscribers relative to the one or more base stations, will often necessitate that the wireless communication devices identify a different base station for facilitating further communication within the network. A decision to select a new serving base station, based upon the movement of the mobile subscriber relative to the one or more base stations, is often the result of a change in the received signal strength between the wireless communication devices and the previous serving base station. Either the received signal strength between the previous serving base station has degraded to an unacceptable level and/or a stronger signal is now available between the wireless communication device and a new alternative base station.

To insure that the wireless communication device is consistently communicating with the best available serving base station, a wireless communication device will periodically scan for neighboring cells and corresponding base stations, and attempt to maintain a synchronization with at least a couple of the more likely handover candidates, based upon the power detected in the associated frequencies, and correspondingly the base station's presence on a neighbor list. In this way, when it becomes desirable to affect a handover, the mobile station has a head start with respect to making a transition to at least some of the more likely handoff candidates.

However in some instances, the relatively high power measurement in a frequency associated with a base station included in a neighbor list can be the result of interference created by another cell from a different network. In many such instances, the interference will negatively impact the ability of the mobile phone to synchronize to the base station in the neighbor list, which is associated with the frequency having the high power measurement. Generally, a base station with which the mobile station cannot be synchronized is likely to eventually be removed from the list of likely candidates. However a base station in the neighbor list whose synchronization has been lost is not always immediately removed from the neighbor list. Sometimes, the failed synchronization needs to have been detected over a span of several synchronization attempts. In other instances, there may be a delay or latency associated with the mobile station's failure to synchronize with the base station over the requisite number of attempts, and the removal of the base station from the neighbor list. During this time, the network may send a handover command instructing the mobile station to attempt a handover to the base station for which synchronization has been recently lost.

In some instances, even though the synchronization has been lost, the mobile station will still attempt to execute a handover to the unsynchronized base station. This is sometimes referred to as a blind handoff, where in some instances, the mobile station may attempt to establish a handover to the unsynchronized base station for a predefined period of time, which in some instances can be on the order of up to 300 ms. In the event that the handover to the unsynchronized base station for which synchronization had been recently lost fails, in at least some of these instances the mobile station may attempt to reconnect to the base station through which the mobile station was previously connected. However, in many instances the mobile station may not be able to reconnect through the previous base station, in part due to the same reasons that the network made the decision to switch away from the previous base station. In such an instance, the mobile station may temporarily lose its connection to the network, and if the mobile station was in the middle of a call, the mobile station can sometimes drop the call.

Consequently, the present inventors have recognized, that more reliable handovers can occur if handover attempts under conditions likely to result in a failed handover attempt are avoided, which in turn can help to improve call performance.

SUMMARY OF THE INVENTION

The present invention provides a method for managing the receipt of a handover command by a wireless communication device operating in a cellular communication system, which includes one or more wireless communication devices and a network infrastructure including a plurality of base stations that supports wireless communications with the one or more wireless communication devices in a plurality of respective cellular regions. The method includes receiving in a wireless communication device a command from the base station of the network infrastructure, which supports wireless communication in a current cellular region, to execute a handover to a base station of the network infrastructure that supports wireless communication in a target cellular region. The wireless communication device then checks whether the base station of the network infrastructure that supports wireless communication in the target cellular region to which the command is received by the wireless communication device to execute a handover is presently synchronized with the wireless communication device. If the base station of the network infrastructure that supports wireless communication in the target cellular region to which the command is received by the wireless communication device to execute a handover is not presently synchronized with the wireless communication device, a determination is then made of the elapsed time since the base station of the network infrastructure that supports wireless communication in the target cellular region to which the command is received by the wireless communication device to execute a handover was last synchronized with the wireless communication device. If the base station of the network infrastructure that supports wireless communication in the target cellular region to which the command is received by the wireless communication device to execute a handover is not presently synchronized with the wireless communication device, and the time elapsed since the base station of the network infrastructure that supports wireless communication in the target cellular region to which the command is received by the wireless communication device to execute a handover was last synchronized with the wireless communication device is less than a predetermined minimum lost synchronization time period, then the wireless communication device does not attempt to execute the handover requested as part of the received command.

In at least one embodiment, the wireless communication device sends a status message to the network infrastructure identifying a handover failure, as part of not attempting to execute the handover requested by the received command.

In at least a further embodiment, upon receiving the status message identifying a handover failure, the network infrastructure tags as not being a suitable handover candidate for at least a predetermined tagged period of time, the base station of the network infrastructure that supports wireless communication in the target cellular region to which the command is received by the wireless communication device to execute a handover.

The present invention further provides a cellular wireless communication device. The cellular wireless communication device includes a wireless radio frequency transceiver, which is adapted for communicating with a network infrastructure including a plurality of base stations each associated with one of a plurality of respective cellular regions. The cellular wireless communication device further includes a communication controller. The communication controller includes a synchronization module for maintaining synchronization of the cellular wireless communication device with one or more base stations, a timer module for maintaining a relative time reference and tracking an elapsed time relative to a time reference, a storage module for maintaining over a predetermined duration a record of base station synchronization with the cellular wireless communication device including relative times when synchronization has been established and relative times when synchronization has been lost with respect to the one or more base stations, and a handover module for managing a handover request when a handover command including a target base station associated with a target cellular region to which the network infrastructure is requesting the cellular wireless communication device to be handed over is received from the network infrastructure. The handover module is adapted for determining whether the target base station is synchronized with the cellular wireless communication device, when a handover command is received, where if the target base station is not synchronized with the cellular wireless communication device, the handover module is further adapted for determining the elapsed time since the target base station was last synchronized with the cellular wireless communication device, and comparing the elapsed time to a predetermined minimum lost synchronization time period, and if the elapsed time since the target base station was last synchronized with the cellular wireless communication device is less than the predetermined minimum lost synchronization time period and the target base station is not currently synchronized with the cellular wireless communication device, then not attempting to execute the handover requested as part of the received handover command.

The present invention still further provides a cellular wireless communication system. The cellular wireless communication system includes a network infrastructure, which includes a plurality of base stations, where each base station is associated with one of a plurality of respective cellular regions. The cellular wireless communication system further includes one or more cellular wireless communication devices, where each cellular wireless communication device includes a wireless radio frequency transceiver, which is adapted for communicating with a network infrastructure including a plurality of base stations each associated with one of a plurality of respective cellular regions. Each cellular wireless communication device further includes a communication controller. The communication controller includes a synchronization module for maintaining synchronization of the cellular wireless communication device with one or more base stations, a timer module for maintaining a relative time reference and tracking an elapsed time relative to a time reference, a storage module for maintaining over a predetermined duration a record of base station synchronization with the cellular wireless communication device including relative times when synchronization has been established and relative times when synchronization has been lost with respect to the one or more base stations, and a handover module for managing a handover request when a handover command including a target base station associated with a target cellular region to which the network infrastructure is requesting the cellular wireless communication device to be handed over is received from the network infrastructure. The handover module is adapted for determining whether the target base station is synchronized with the cellular wireless communication device, when a handover command is received, where if the target base station is not synchronized with the cellular wireless communication device, the handover module is further adapted for determining the elapsed time since the target base station was last synchronized with the cellular wireless communication device, and comparing the elapsed time to a predetermined minimum lost synchronization time period, and if the elapsed time since the target base station was last synchronized with the cellular wireless communication device is less than the predetermined minimum lost synchronization time period and the target base station is not currently synchronized with the cellular wireless communication device, then not attempting to execute the handover requested as part of the received handover command.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

Figure 1:
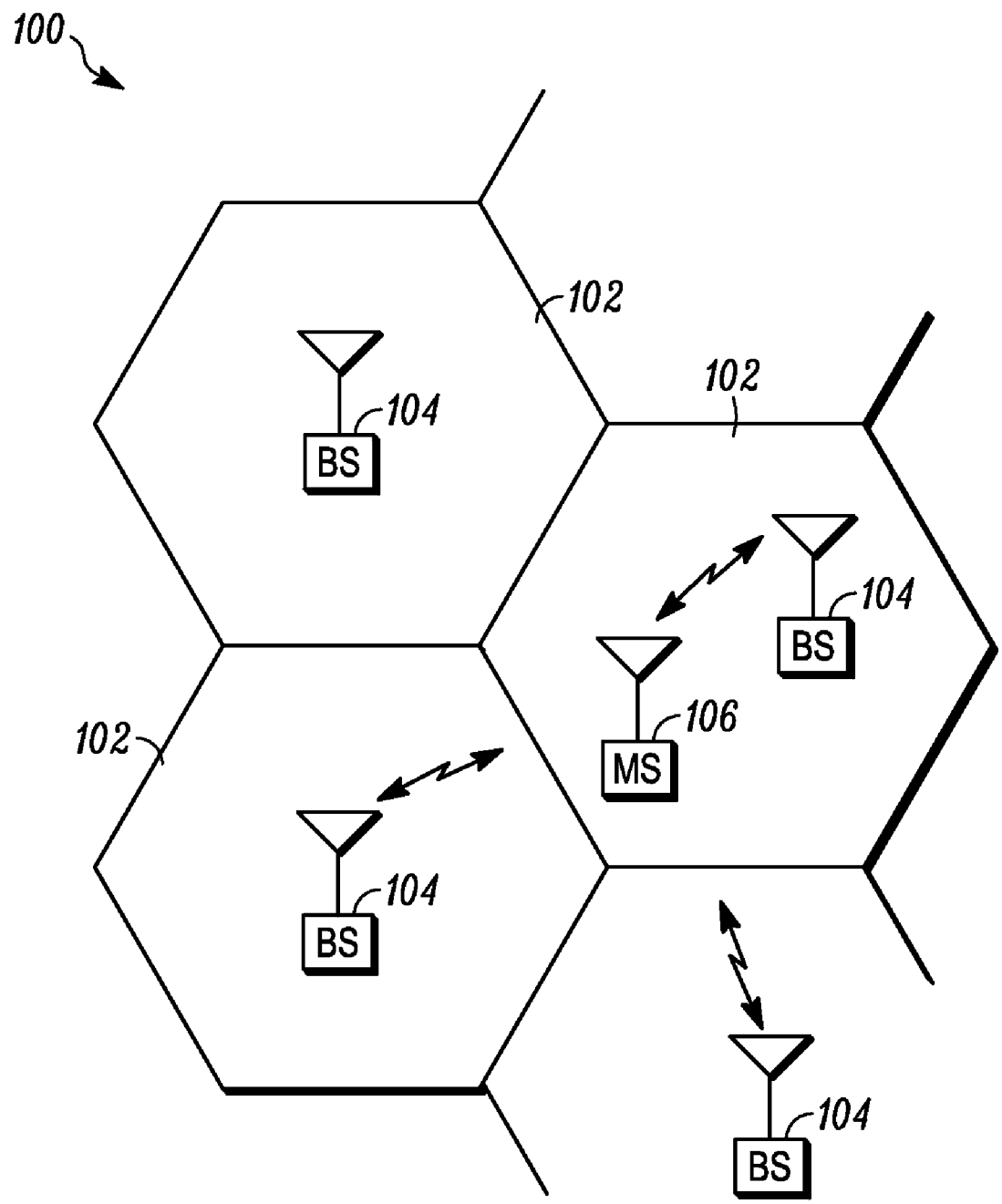
FIG. 1 is an exemplary topographical view of a geographical region representing a portion of the coverage area for a wireless communication system.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates an exemplary topographical view of portions of a wireless communication system. The topographical view 100 includes a plurality of cells 102 pictorially represented as hexagons. The hexagons are only rough approximations, where in reality the area of transmission is not so uniformly defined. Each cell is typically served by one or more base stations (BS) 104, referred to as a serving station, which communicates with mobile subscriber (MS) 106 traveling within the corresponding cell 102.

Generally, the further a mobile subscriber 106 moves away from the serving base station 104 the weaker the signal gets. Conversely, as a mobile station 106 moves toward a base station 104 the signal typically becomes stronger. As a mobile subscriber 106 continues to move away from a serving base station 104 and towards a base station 104 of a neighboring cell 102, at some point it will become desirable to transfer control of the continued communication to the base station 104 of the neighboring cell 102. The decision to transfer control is typically determined based upon the relative strength of the signal received from the serving base station and the base stations of each of the nearby cells 102. Consequently, wireless communication devices operating in association with several over the air operating standards monitor the relative strength of signals from both the serving cell and the one or more nearby neighboring cells.

Generally, the signals from the respective cells are distinguishable, as they are broadcast within distinct channels that are ideally substantially orthogonal to one another. For example, the GSM standard includes channels, associated with assigned frequencies that are spaced 200 kHz apart. Each of the base stations is assigned one or more frequencies within a predefined band of frequencies. Because there are a finite number of frequencies, frequencies are often reused in other cells that are preferably far enough away that the use of the same frequency in another cell is unlikely to interfere with the use of the same frequency in a current cell. However sometimes, the frequency assignments are not so ideal, or there is noise from another source that infringes upon a particular frequency, such as cell from another network. Consequently, when a scan for neighboring cells takes place a power measurement in one or more of the frequencies can create an impression that a particular base station may be a good handover candidate, when the source of the relatively strong power measurement may be from another source.

Generally, the scanned frequencies are sorted based upon the amount of detected power in the respective frequency, and the information is maintained in a neighbor list. The mobile subscriber then attempts to synchronize to some of the more attractive appearing handover candidates, even though there may be no current desire to affect a handover. During this time the suitability of a particular neighbor cell contained in the neighbor list can be evaluated. As cells contained in the neighbor list are identified as being unsuitable, it is intended that the unsuitable cells are eventually removed from the list. However, there are instances when the need for a handover will be identified and a command that requests a handover to a cell that has not yet been removed, which is unsynchronized or badly synchronized, may be received.

In at least some aspects of the present invention, upon receipt of a handover command, the mobile subscriber will check the synchronization status of the identified target base station, and if the target base station is not presently synchronized, the mobile subscriber will check the amount of time that has elapsed since the identified target base station was last synchronized. If the elapsed time since the last synchronization is less than a predetermined minimum lost synchronization period of time, the mobile subscriber will not attempt to execute the handover requested as part of the received command. The command will effectively be aborted. In some instances the minimum lost synchronization period of time may be supplied to the mobile subscriber from the network. Sometimes, it may be included as part of the handover request command. In other instances, the minimum lost synchronization period of time may be maintained and stored by the mobile subscriber, where in some instances it may be based upon a determined latency period between when the mobile subscriber determines that synchronization of the base station has been lost, and the time it takes for the synchronization status of the base station in the network infrastructure to be updated.

In at least some instances, the mobile subscriber will inform the network that the command was not attempted and the reason the command was not attempted. In turn, the network may tag the base station as not being a suitable handover candidate for at least a predetermined tagged period of time.

The minimum lost synchronization period of time, in at least some instances, will help identify the difference between a real blind handover request associated with a new cell in the mobile subscriber environment and a cell which has been erroneously detected and/or is badly synchronized.

It may be further desirable to maintain a connection with the current base station, when a command is received to handover to a target base station whose synchronization has been recently lost and therefore the command will likely be aborted. In this way, the mobile subscriber can maintain the existing communication connection, and limit the likelihood that the call connection may be lost. In connection with some cellular networks such as a GSM (Global System for Mobile Communications) network, maintaining the existing communication connection involves not suspending the L2 connection, where more traditionally the L2 connection is suspended when attempting a handover. An L2 connection is then reestablished with the target base station after the handover is completed (or is attempted to be reestablished with the original base station should the handover with the target base station fail).

Figure 2:
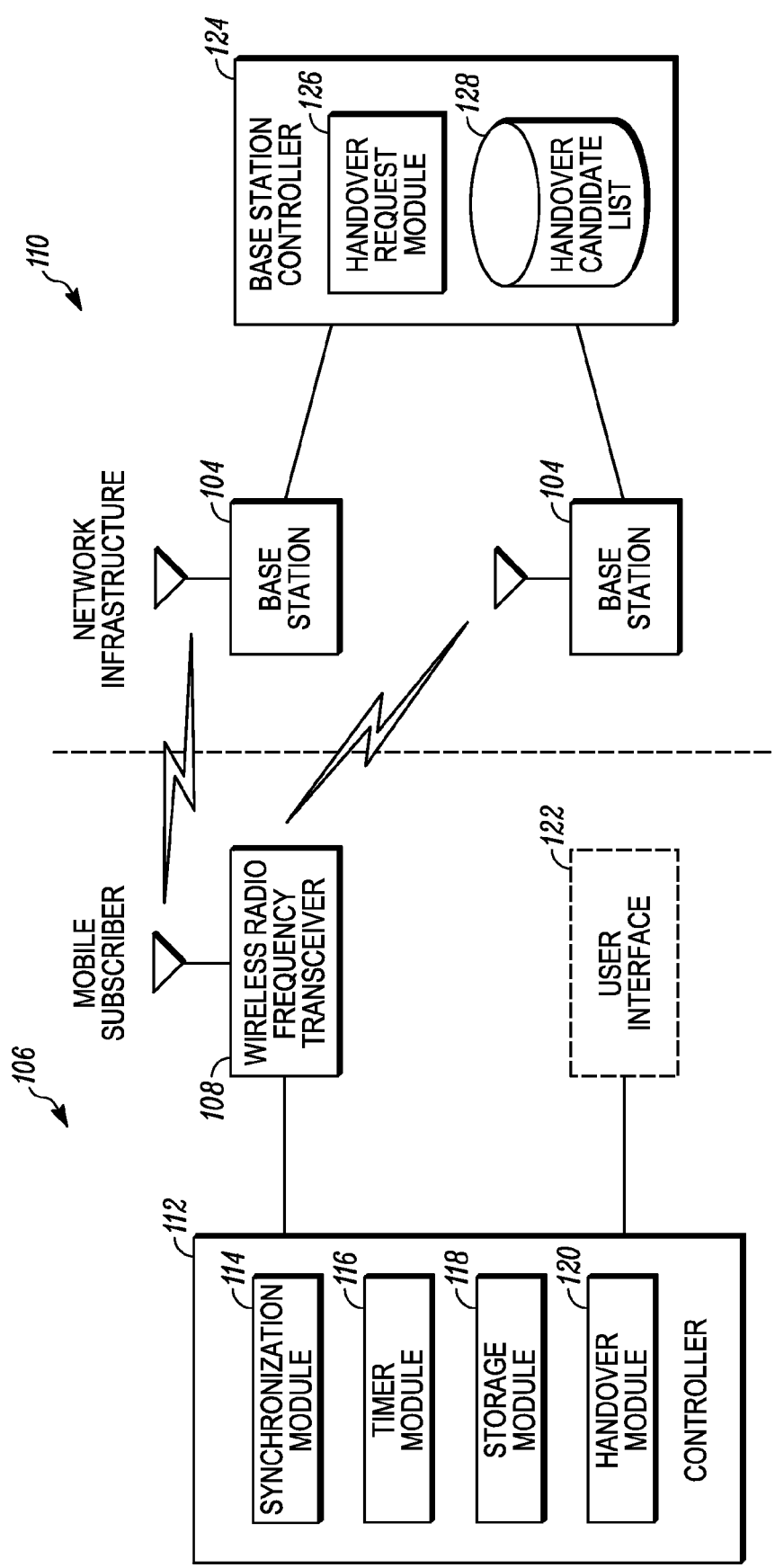
FIG. 2 is a block diagram of a mobile subscriber and the portion of the network infrastructure with which the mobile subscriber more directly communicates.

FIG. 2 illustrates a block diagram of a mobile subscriber 106 and the portion of the network infrastructure with which the mobile subscriber 106 more directly communicates. The mobile subscriber 106 includes a wireless ratio frequency transceiver 108, which is adapted for communicating wirelessly with one or more base stations 104 of the network infrastructure 110. The mobile subscriber 106 additionally includes a communication controller 112, which manages at least part of the operation of the mobile subscriber 106.

The communication controller 112 includes a synchronization module 114, which is adapted to maintain synchronization of the mobile subscriber 106 with the one or more base stations 104. The communication controller 112 further includes a timer module 116, which is adapted to maintain a relative time reference and track an elapsed time relative to a time reference, such as the time that has elapsed since synchronization with a particular base station may have been lost. The communication controller 112 still further includes a storage module, which is adapted to maintain a record of base station synchronization with the cellular wireless communication device including relative times when synchronization has been established and relative times when synchronization has been lost with respect to the one or more base stations.

The communication further yet includes a handover module, which is adapted to manage a handover request when a handover command including a target base station is received from the network infrastructure. The handover module is further adapted for determining whether the target base station is synchronized with the cellular wireless communication device, where if the target base station is not synchronized with the cellular wireless communication device, the handover module is further adapted for determining the elapsed time since the target base station was last synchronized with the cellular wireless communication device, and comparing the elapsed time to a predetermined minimum lost synchronization time period. If the elapsed time since the target base station was last synchronized with the cellular wireless communication device is less than the predetermined minimum lost synchronization time period and the target base station is not currently synchronized with the cellular wireless communication device, then the mobile subscriber is directed by the communication controller not to attempt to execute the handover requested as part of the received handover command.

Where the mobile subscriber 106 is a radio frequency telephone, the mobile subscriber 106 may further include user interface circuitry 122, to facilitate any interaction between the radio frequency telephone and the user.

The illustrated portion of the network infrastructure includes at least a pair of base stations 104, which are coupled to a base station controller 124. The base station controller 124 would then be coupled to further portions of the network infrastructure to facilitate the routing of any communication between the mobile subscriber 106 and its intended destination. While the pair of base stations 104 are shown as being commonly coupled to the same base station controller 124, one skilled in the art will readily recognize that some of the base stations 104 may couple to the network infrastructure through different base station controllers 124.

In the illustrated embodiment, the base station controller 124 includes a handover request module 126, which is adapted to monitor the received power levels of signals received by the mobile subscriber 106 along each of the communication channels (i.e. assigned frequencies) associated with each of the base stations, and determining when to send a command for the mobile subscriber 106 to execute a handover. The base station controller 124 makes the determination based upon information maintained in the base station controller 124 and/or received from the mobile subscriber 106, such as a handover candidate list 128, which may additionally include any of the information that is relied upon in making the handover decision, such as the above noted received power levels and synchronization status relative to the mobile subscriber 106 associated with each of the handover candidates.

Figure 3:
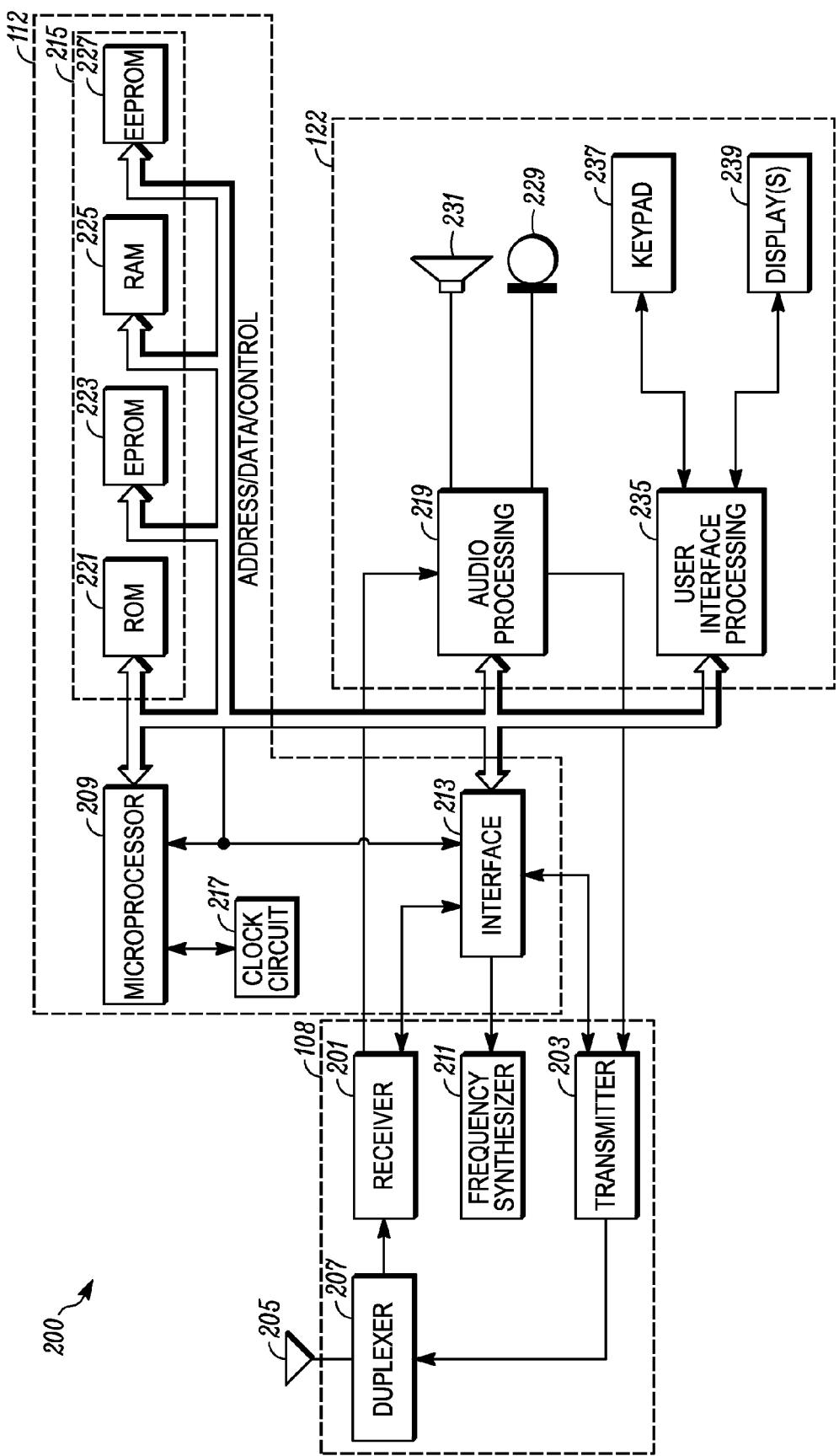
FIG. 3 is a more detailed block diagram of the electronic circuitry for at least one embodiment of a mobile subscriber, such as a wireless communication device, which could be used to incorporate the present invention.

FIG. 3 is a more detailed block diagram of the electronic circuitry for at least one embodiment of a mobile subscriber 106, such as a radio frequency telephone 200, which could be used to incorporate the present invention. The radio frequency telephone 200 includes a radio receiver 201 and a transmitter 203. Both the receiver 201 and the transmitter 203 together form a portion of a radio transceiver 108, which is coupled to an antenna 205 of the wireless communication device by way of a duplexer 207. The particular radio frequency to be used by the transmitter 203 and the receiver 201 is determined by a microprocessor 209, which forms part of a communication controller 112, and is conveyed to the frequency synthesizer 211 via the interface circuitry 213. Data signals received by the receiver 201 are decoded and coupled to the microprocessor 209 by the interface circuitry 213, and data signals to be transmitted by the transmitter 203 are generated by the microprocessor 209 and formatted by the interface circuitry 213 before being transmitted by the transmitter 203. Operational status of the transmitter 203 and the receiver 201 is enabled or disabled by the interface circuitry 213.

As noted above in at least some embodiments, the microprocessor 209 forms part of the communication controller 112, which in conjunction with the interface circuitry 213 performs the necessary processing functions under the control of programs stored in a memory section 215. Together, the microprocessor 209 and the interface circuitry 213 can include one or more microprocessors, one or more of which may include a digital signal processor (DSP). The memory section 215 includes one or more forms of volatile and/or non-volatile memory including conventional ROM 221, EPROM 223, RAM 225, or EEPROM 227. Characterizing features of the radio frequency telephone 200 are typically stored in EEPROM 227 (which may also be stored in the microprocessor in an on-board EEPROM, if available) and can include the number assignment (NAM) required for operation in a conventional cellular system and/or the base identification (BID) required for operation with a cordless base. Additionally stored in the memory section 215 are the multiple sets of prestored instructions used in managing the receipt of a handover command by a radio frequency telephon operating in a cellular communication system. While at least some of the operational control can be managed under the direction of one or more sets of prestored instructions, one skilled in the art will readily recognize that other forms of control can include sequential station machines and operational logic circuitry, which could be implemented in hardware, software and/or both. To the extent that any portions of the control is implemented using hardware elements, the same could be constructed using discrete logic elements, gate array or programmable logic array type structures, and/or could be implemented in a VLSI type structure, without departing from the teachings of the present invention.

In the illustrated embodiment, the communication controller 112 further includes a clock circuit 217 for use with functions involving the determination of an absolute or a relative time, including the amount of time that may have elapsed relative to a reference time.

Control of user audio, via a microphone 229 for producing an audio output and a speaker 231 for receiving an audio input, is controlled by audio processing circuitry 219, which forms part of a user interface circuit 122. The user interface circuit 122 additionally includes user interface processing circuitry 235, which manages the operation of any keypad(s) 237 and/or display(s) 239. It is further envisioned that any keypad operation could be included as part of a touch sensitive display.

Figure 4:
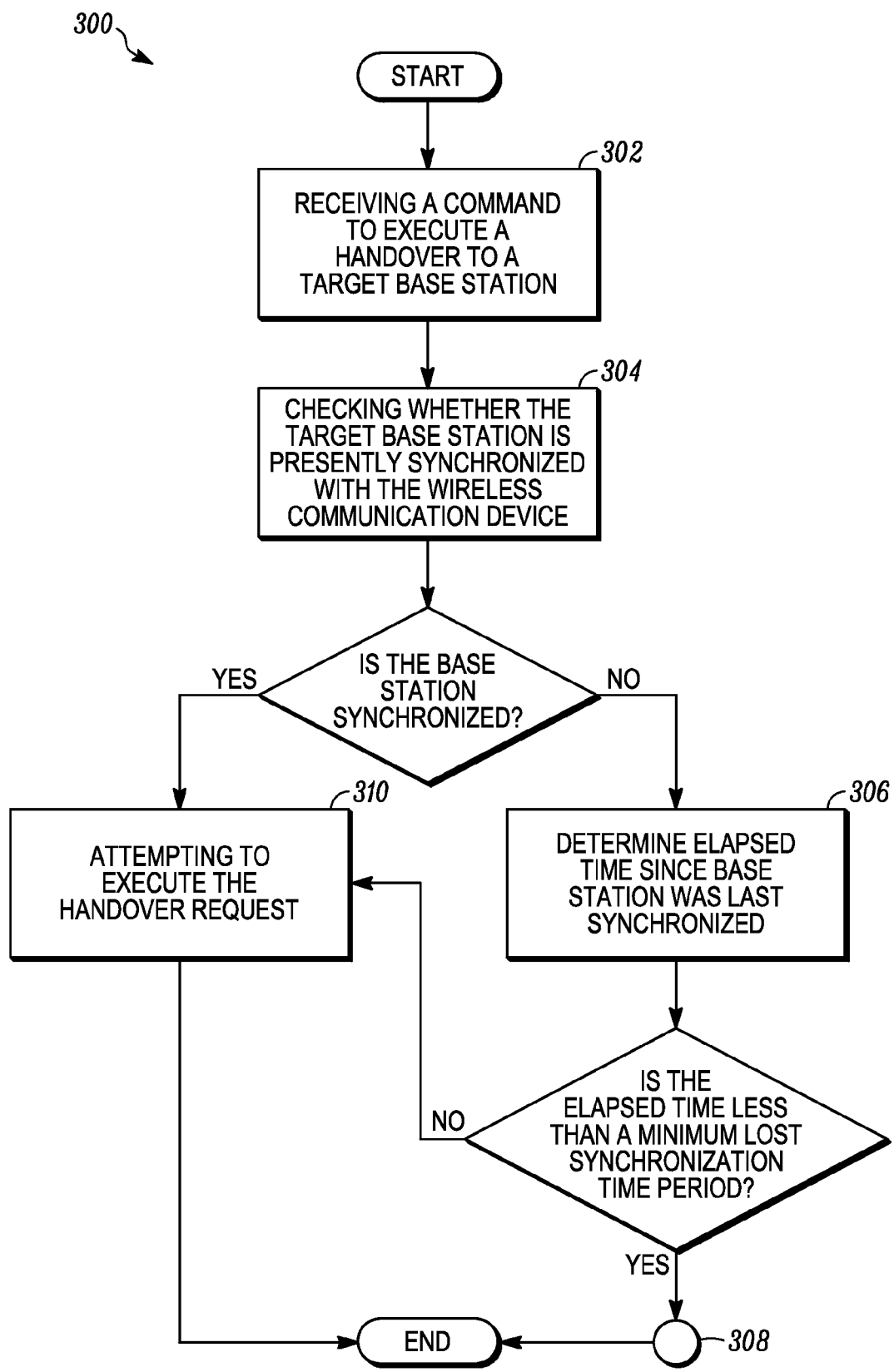
FIG. 4 is a flow diagram of a method for managing the receipt of a handover command, in accordance with at least one embodiment of the present invention.

FIG. 4 illustrates a flow diagram 300 of a method for managing the receipt and execution of a handover command by a wireless communication device operating in a cellular communication system. Generally, the flow diagram can be implemented as part of the one or more sets of prestored instructions stored in the memory section 215 of the communication controller 112 for execution in conjunction with the microprocessor 209. At least one example includes a set of prestored instructions for receiving in a wireless communication device a command from the base station of the network infrastructure to execute a handover to a base station of the network infrastructure that supports wireless communication in a target cellular region. The multiple sets of prestored instructions can further include instructions for checking whether the base station of the network infrastructure that supports wireless communication in the target cellular region is presently synchronized with the wireless communication device.

If the base station of the network infrastructure that supports wireless communication in the target cellular region to which the command is received by the wireless communication device to execute a handover is not presently synchronized with the wireless communication device, then a determination can be made as to the elapsed time since the base station of the network infrastructure that supports wireless communication in the target cellular region was last synchronized with the wireless communication device. If the base station of the network infrastructure that supports wireless communication in the target cellular region is not presently synchronized with the wireless communication device, and the time elapsed since the target base station was last synchronized with the wireless communication device is less than a predetermined minimum lost synchronization time period, then the wireless communication device will not attempt to execute the handover requested as part of the received command. Corresponding elements are illustrated as part of the flow diagram 300.

More specifically, the method for managing the receipt of a handover command by a wireless communication device operating in a cellular communication system, illustrated in flow diagram 300, initially includes receiving 302 a command to execute a handover to a target base station of the network infrastructure that supports wireless communication in a target cellular region.

The wireless communication device then checks 304, whether the target base station is presently synchronized with the wireless communication device. If the target base station is not presently synchronized with the wireless communication device, then a determination 306 is made as to the elapsed time since the target base station was last synchronized with the wireless communication device. If the target base station is not presently synchronized with the wireless communication device, and the time elapsed since the target base station was last synchronized with the wireless communication device is less than a predetermined minimum lost synchronization time period, then the wireless communication device does not attempt 308 and/or aborts the execution of the handover requested as part of the received command. Otherwise, an execution of the handover request is attempted 310.

Figure 5:
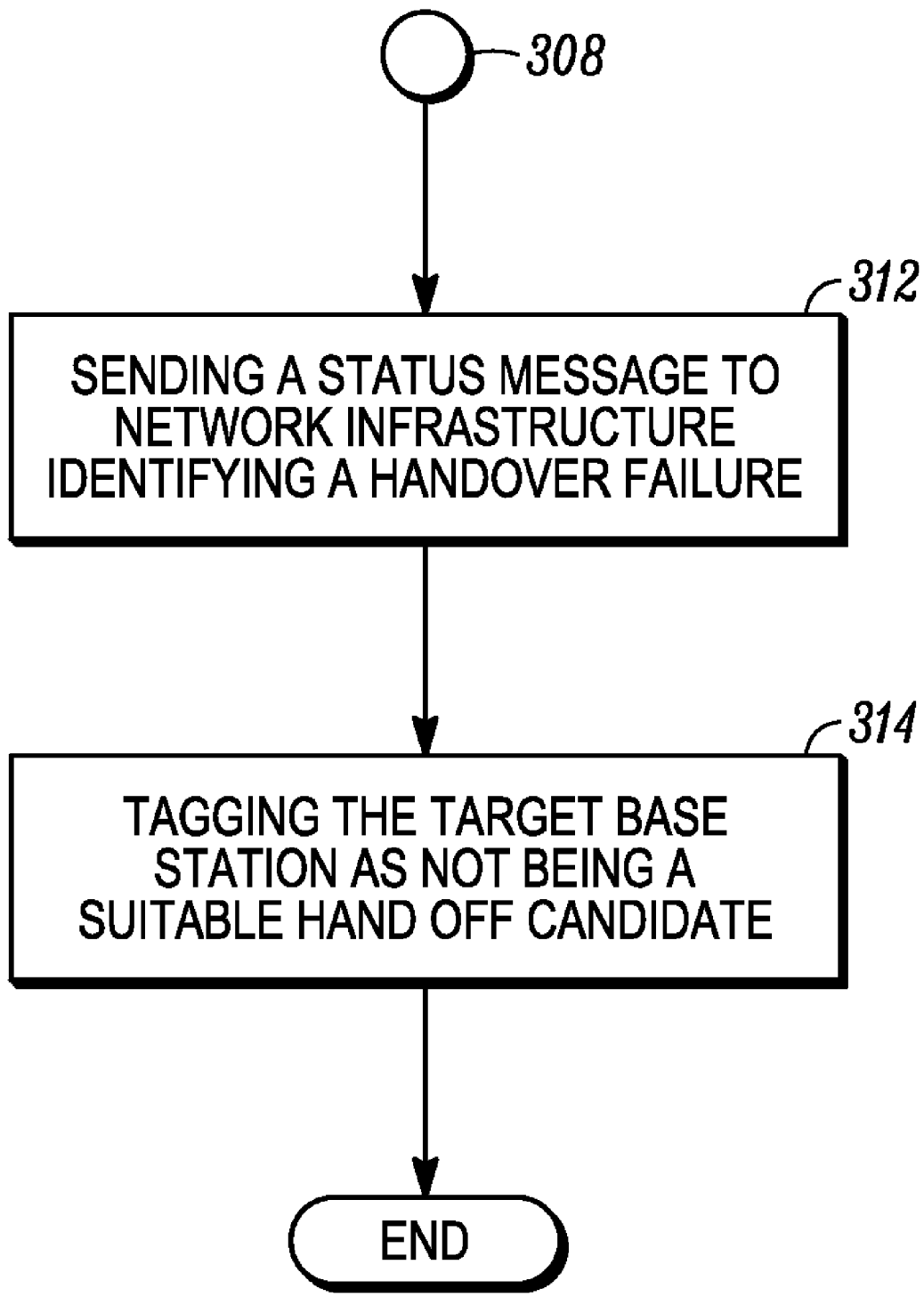
FIG. 5 is a more detailed flow diagram associated with not attempting to execute the handover request.

FIG. 5 illustrates a more detailed flow diagram associated with not attempting to execute 308 the handover requested as part of the received 302 command. The more detailed flow diagram 308 includes sending 312 a status message to the network infrastructure identifying a handover failure resulting from the recent loss of base station synchronization. The target base station is then tagged as not being a suitable handoff candidate for a predetermined period of time.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for managing the receipt of a handover command by a wireless communication device operating in a cellular communication system, which includes one or more wireless communication devices and a network infrastructure including a plurality of base stations that supports wireless communications with the one or more wireless communication devices in a plurality of respective cellular regions, the method comprising:

receiving in a wireless communication device a command from the base station of the network infrastructure, which supports wireless communication in a current cellular region, to execute a handover to a base station of the network infrastructure that supports wireless communication in a target cellular region;

checking by the wireless communication device, whether the base station of the network infrastructure that supports wireless communication in the target cellular region to which the command is received by the wireless communication device to execute a handover is presently synchronized with the wireless communication device;

if the base station of the network infrastructure that supports wireless communication in the target cellular region to which the command is received by the wireless communication device to execute a handover is not presently synchronized with the wireless communication device, determining the elapsed time since the base station of the network infrastructure that supports wireless communication in the target cellular region to which the command is received by the wireless communication device to execute a handover was last synchronized with the wireless communication device;

if the base station of the network infrastructure that supports wireless communication in the target cellular region to which the command is received by the wireless communication device to execute a handover is not presently synchronized with the wireless communication device, and the time elapsed since the base station of the network infrastructure that supports wireless communication in the target cellular region to which the command is received by the wireless communication device to execute a handover was last synchronized with the wireless communication device is less than a predetermined minimum lost synchronization time period, then not attempting by the wireless communication device to execute the handover requested as part of the received command.

2. A method in accordance with claim 1, wherein if the base station of the network infrastructure that supports wireless communication in the target cellular region to which the command is received by the wireless communication device to execute a handover is presently synchronized with the wireless communication device, or the elapsed time since the base station of the network infrastructure that supports wireless communication in the target cellular region to which the command is received by the wireless communication device to execute a handover was last synchronized with the wireless communication device is greater than the predetermined amount of time, then the wireless communication device attempts to execute the handover requested as part of the received command.

3. A method in accordance with claim 1, wherein as part of not attempting to execute the handover requested by the received command, the wireless communication device sends a status message to the network infrastructure identifying a handover failure.

4. A method in accordance with claim 3, wherein the status message to the network infrastructure identifying a handover failure, comprises an indication of the reason for failure including an indication that the synchronization with the base station of the network infrastructure that supports wireless communication in the target cellular region to which the command is received by the wireless communication device to execute a handover has been lost within an elapsed period of time, which is less than the predetermined minimum lost synchronization time period.

5. A method in accordance with claim 3, wherein upon receiving the status message identifying a handover failure, the network infrastructure tags the base station of the network infrastructure that supports wireless communication in the target cellular region to which the command is received by the wireless communication device to execute a handover as not being a suitable handover candidate for at least a predetermined tagged period of time.

6. A method in accordance with claim 1, wherein an amount of time defining the predetermined minimum lost synchronization time period is received as part of the command to execute a handover.

7. A method in accordance with claim 1, wherein an amount of time defining the predetermined minimum lost synchronization time period corresponds to the latency associated with when the synchronization with a potential target cell is first lost by the wireless communication device and when the potential target cell is removed from the list of potential handoff candidates for the wireless communication device stored in the network infrastructure.

8. A method in accordance with claim 1, wherein as part of not attempting to execute the handover requested as part of the received command, the wireless communication device maintains the communication connection with the network infrastructure through the base station of the network infrastructure, which supports wireless communication in the current cellular region.

9. A method in accordance with claim 1, wherein the cellular communication system is a cellular communication system of the type operating in accordance with the global system for mobile communications standard.

10. A cellular wireless communication device comprising:
a wireless radio frequency transceiver adapted for communicating with a network infrastructure including a plurality of base stations each associated with one of a plurality of respective cellular regions; and
a communication controller including:
a synchronization module for maintaining synchronization of the cellular wireless communication device with one or more base stations;
a timer module for maintaining a relative time reference and tracking an elapsed time relative to a time reference;
a storage module for maintaining over a predetermined duration a record of base station synchronization with the cellular wireless communication device including relative times when synchronization has been established and relative times when synchronization has been lost with respect to the one or more base stations; and
a handover module for managing a handover request when a handover command including a target base station associated with a target cellular region to which the network infrastructure is requesting the cellular wireless communication device to be handed over is received from the network infrastructure, where the handover module is adapted for determining whether the target base station is synchronized with the cellular wireless communication device, where if the target base station is not synchronized with the cellular wireless communication device, the handover module is further adapted for determining the elapsed time since the target base station was last synchronized with the cellular wireless communication device, and comparing the elapsed time to a predetermined minimum lost synchronization time period, and if the elapsed time since the target base station was last synchronized with the cellular wireless communication device is less than the predetermined minimum lost synchronization time period and the target base station is not currently synchronized with the cellular wireless communication device, then not attempting to execute the handover requested as part of the received handover command.

11. A cellular wireless communication device in accordance with claim 10, wherein the handover module is further adapted to attempt to execute the handover requested as part of the received handover command, when the target base station is synchronized with the cellular wireless communication device or the elapsed time since the target base station was last synchronized with the cellular wireless communication device is greater than the predetermined minimum lost synchronization time period.

12. A cellular wireless communication device in accordance with claim 10, wherein the handover module is further adapted to sends a status message via the wireless radio frequency transceiver to the network infrastructure identifying a handover failure as part of not attempting to execute the handover requested as part of the received command.

13. A cellular wireless communication device in accordance with claim 10, wherein the status message to the network infrastructure identifying a handover failure, comprises an indication of the reason for failure including an indication that the synchronization with the target base station has been lost within an elapsed period of time, which is less than the predetermined minimum lost synchronization time period.

14. A cellular wireless communication device in accordance with claim 10, wherein the cellular wireless communication device is compatible with the global system for mobile communications standard.

15. A cellular wireless communication system comprising:
a network infrastructure including a plurality of base stations, each base station being associated with one of a plurality of respective cellular regions; and
one or more cellular wireless communication devices, each cellular wireless communication device including:
a wireless radio frequency transceiver adapted for communicating with a network infrastructure including a plurality of base stations each associated with one of a plurality of respective cellular regions; and
a communication controller, the communication controller including:
a synchronization module for maintaining synchronization of the cellular wireless communication device with one or more base stations;
a timer module for maintaining a relative time reference and tracking an elapsed time relative to a time reference;
a storage module for maintaining over a predetermined duration a record of base station synchronization with the cellular wireless communication system including relative times when synchronization with the cellular wireless communication system has been established and relative times when synchronization with the cellular wireless communication system has been lost with respect to the one or more base stations; and
a handover module for managing a handover request when a handover command including a target base station associated with a target cellular region to which the network infrastructure is requesting the cellular wireless communication device to be handed over is received from the network infrastructure, where the handover module is adapted for determining whether the target base station is synchronized with the cellular wireless communication device, where if the target base station is not synchronized with the cellular wireless communication system, the handover module is further adapted for determining the elapsed time since the target base station was last synchronized with the cellular wireless communication system, and comparing the elapsed time to a predetermined minimum lost synchronization time period, and if the elapsed time since the target base station was last synchronized with the cellular wireless communication device is less than the predetermined minimum lost synchronization time period and the target base station is not currently synchronized with the cellular wireless communication system, then not attempting to execute the handover requested as part of the received handover command.

16. A cellular wireless communication system in accordance with claim 15, the network infrastructure is adapted to transmit to the at least one cellular wireless communication device an amount of time defining the predetermined minimum lost synchronization time period as part of the transmission of a command to execute a handover.

17. A cellular wireless communication system in accordance with claim 15, wherein an amount of time defining the predetermined minimum lost synchronization time period corresponds to the latency associated with when the synchronization with a potential target cell is first lost by the wireless communication device and when the potential target cell is removed from the list of potential handoff candidates for the wireless communication device stored in the network infrastructure.

18. A cellular wireless communication system in accordance with claim 15, wherein the cellular wireless communication system is compatible with the global system for mobile communications standard.

* * * * *